US012756840B2

(12) United States Patent
Jeon et al.

(10) Patent No.: US 12,756,840 B2
(45) Date of Patent: Oct. 6, 2026

(54) METHOD AND APPARATUS FOR ENCODING INTRA PREDICTION MODE FOR EACH CHROMA COMPONENT

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Bum Yoon Kim, Yongin-si (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/864,166

(22) PCT Filed: Apr. 17, 2023

(86) PCT No.: PCT/KR2023/005159

§ 371 (c)(1),
(2) Date: Nov. 8, 2024

(87) PCT Pub. No.: WO2023/219290

PCT Pub. Date: Nov. 16, 2023

(65) Prior Publication Data

US 2025/0310539 A1 Oct. 2, 2025

(30) Foreign Application Priority Data

May 13, 2022 (KR) ........................ 10-2022-0058719
Apr. 12, 2023 (KR) ........................ 10-2023-0048430

(51) Int. Cl.
*H04N 19/70* (2014.01)
*H04N 19/159* (2014.01)
(Continued)

(52) U.S. Cl.
CPC ......... *H04N 19/159* (2014.11); *H04N 19/176* (2014.11); *H04N 19/186* (2014.11); *H04N 19/70* (2014.11)

(58) Field of Classification Search
None
See application file for complete search history.

(56) References Cited

U.S. PATENT DOCUMENTS

2022/0210481 A1* 6/2022 Fan ...................... H04N 19/132
2022/0264101 A1 8/2022 Koo et al.
(Continued)

FOREIGN PATENT DOCUMENTS

KR 2021-0118951 A 10/2021
KR 2022-0057613 A 5/2022
(Continued)

OTHER PUBLICATIONS

International Search Report and Written Opinion for Int. App. No. PCT/KR2023/005159, mailed Aug. 2, 2023.
(Continued)

*Primary Examiner* — Samuel D Fereja
(74) *Attorney, Agent, or Firm* — MCDONNELL BOEHNEN HULBERT & BERGHOFF LLP

(57) ABSTRACT

A method and an apparatus are disclosed for coding an intra-prediction mode for each chroma component. In the disclosed embodiments, a video decoding device decodes, from a bitstream, first intra-prediction mode information for a first chroma channel of the current chroma block. The video decoding device decodes, from the bitstream, second intra-prediction mode information for a second chroma
(Continued)

channel of the current chroma block. Here, the first intra-prediction mode information includes at least one of a first CCLM (cross-component linear model) mode flag, a first CCLM mode index, and a first chroma intra-prediction mode indicator, and the second intra-prediction mode information includes at least one of a second CCLM mode flag, a second CCLM mode index, and a second chroma intra-prediction mode indicator.

17 Claims, 7 Drawing Sheets

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 2022/0312020 | A1 * | 9/2022 | Li | H04N 19/105 |
| 2022/0368919 | A1 | 11/2022 | Li et al. | |

FOREIGN PATENT DOCUMENTS

| | | | |
|---|---|---|---|
| WO | 2021/052492 | A1 | 3/2021 |
| WO | 2021/110116 | A1 | 6/2021 |

OTHER PUBLICATIONS

Che-Wei Kuo et al., "AHG12: Enhanced CCLM", Joint Video Experts Team (JVET) of ITU-T SG 16 WP 3 and ISO/IEC JTC 1/SC 29 26th Meeting, by teleconference, JVET-Z0140-v2, Apr. 27, 2022. Retrieved from https://www.jvet-experts.org/doc_end_user/current_document.php?id=11589 on Jul. 10, 2023.

* cited by examiner

METHOD AND APPARATUS FOR ENCODING INTRA PREDICTION MODE FOR EACH CHROMA COMPONENT

CROSS REFERENCE TO RELATED APPLICATIONS

The present application is a U.S. National Phase Application pursuant to 35 U.S.C. § 371 of International Application No. PCT/KR2023/005159 filed Apr. 17, 2023, which claims priority to Korean Patent Application No. 10-2022-0058719 filed on May 13, 2022 and Korean Patent Application No. 10-2023-0048430 filed on Apr. 12, 2023. The entire disclosure contents of these applications are herewith incorporated by reference into the present application.

TECHNICAL FIELD

The present disclosure relates to a method and an apparatus for encoding an intra-prediction mode for each chroma component.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Intra prediction to predict pixel values of the current block to be encoded utilizes pixel information within the same picture. In intra prediction, of a plurality of intra-prediction modes, an appropriate one may be selected for the features of the video and used to predict the current block. The encoder selects and uses one of the many intra-prediction modes to encode the current block. The encoder may then pass information on that mode to the decoder.

HEVC technology utilizes a total of 35 intra-prediction modes for intra-prediction, including 33 angular modes that have directionality and two non-angular modes that have no directionality. However, as the spatial resolution of videos increases from 720×480 to 2048×1024 or 8192×4096, the unit size of the prediction block becomes larger and larger, which requires more intra-prediction mode varieties to be added. As illustrated in FIG. 3A, the VVC technique utilizes 67 prediction modes for intra-prediction, which are further subdivided for intra-prediction, allowing for a greater variety of prediction directions than in the prior art.

In general, the image to be encoded is partitioned into Coding Units (CUs) of various shapes and sizes and then encoded in CUs. In this case, a tree structure is the information that prescribes this partitioning. The encoder transfers the tree information to the decoder, dictating how the image is divided into CUs of different shapes and sizes. In that process, the luma (Y) and chroma (Cb, Cr) images may be split into separate CUs having different structures. Alternatively, the luma and chroma images can be split into CUs of the same shape.

A technique that provides the luma and chroma images with different partition structures is referred to as a chroma separate tree (CST) technique or dual tree technique. So, when the CST technique is used, the chroma image may be partitioned according to a different partitioning method than the luma image. On the other hand, a technique that provides the luma and chroma images with the same partition structure is called a single tree technique. When the single tree technique is used, the chroma image can have the same partition structure as the luma image.

Conventional intra-prediction techniques, regardless of whether a dual tree or single tree is used, set one intra-prediction mode without distinguishing between the Cb channel and the Cr channel. Thereafter, the existing techniques perform intra prediction and encoding by applying the same intra-prediction mode to the Cb and Cr channels. However, since the images of the Cb channel and Cr channel may generally exhibit different properties, fair image quality may not always be obtained when predicting and encoding the two chroma channels by using the same intra-prediction mode according to the existing technology. Therefore, a method for efficiently encoding/decoding the intra-prediction modes of the Cb channel and the Cr channel needs to be considered to increase the video coding efficiency and enhance the video quality.

DISCLOSURE

Technical Problem

The present disclosure seeks to provide a video coding method and an apparatus that, in intra-predicting a current chroma block, encode/decode a component-specific prediction mode adapted to each of video features of chroma components of Cb channel and Cr channel.

Technical Solution

At least one aspect of the present disclosure provides a method performed by a video decoding device for decoding an intra-prediction mode of a current chroma block. The method includes decoding, from a bitstream, first intra-prediction mode information for a first chroma channel of the current chroma block. The method also includes decoding, from the bitstream, second intra-prediction mode information for a second chroma channel of the current chroma block. Here, the first intra-prediction mode information comprises at least one of a first cross-component linear model mode flag (CCLM mode flag), a first cross-component linear model mode index (CCLM mode index), and a first chroma intra-prediction mode indicator, and the second intra-prediction mode information comprises at least one of a second CCLM mode flag, a second CCLM mode index, and a second chroma intra-prediction mode indicator. The first CCLM mode index indicates one of preset CCLM mode candidates, and the first chroma intra-prediction mode indicator indicates one of preset intra-prediction mode candidates.

Another aspect of the present disclosure provides a method performed by a video encoding device for encoding an intra-prediction mode of a current chroma block. The method includes determining first intra-prediction mode information for a first chroma channel of the current chroma block. The method also includes determining second intra-prediction mode information for a second chroma channel of the current chroma block. Here, the first intra-prediction mode information comprises at least one of a first cross-component linear model mode flag (CCLM mode flag), a first cross-component linear model mode index (CCLM mode index), and a first chroma intra-prediction mode indicator, and the second intra-prediction mode information comprises at least one of a second CCLM mode flag, a second CCLM mode index, and a second chroma intra-prediction mode indicator. The first CCLM mode index indicates one of preset CCLM mode candidates, and the first chroma intra-prediction mode indicator indicates one of preset intra-prediction mode candidates.

Yet another aspect of the present disclosure provides a computer-readable recording medium storing a bitstream generated by a video encoding method. The video encoding method includes determining first intra-prediction mode information for a first chroma channel of a current chroma block. The video encoding method also includes determining second intra-prediction mode information for a second chroma channel of the current chroma block. Here, the first intra-prediction mode information comprises at least one of a first cross-component linear model mode flag (CCLM mode flag), a first cross-component linear model mode index (CCLM mode index), and a first chroma intra-prediction mode indicator, and the second intra-prediction mode information comprises at least one of a second CCLM mode flag, a second CCLM mode index, and a second chroma intra-prediction mode indicator. The first CCLM mode index indicates one of preset CCLM mode candidates, and the first chroma intra-prediction mode indicator indicates one of preset intra-prediction mode candidates.

Advantageous Effects

As described above, the present disclosure provides a video coding method and an apparatus that, in intra-predicting a current chroma block, encode/decode a component-specific prediction mode adapted to each of video features of Cb channel and Cr channel chroma components. Thus, the video coding method and the apparatus increase video coding efficiency and enhance video quality.

DETAILED DESCRIPTION

Figure 1:
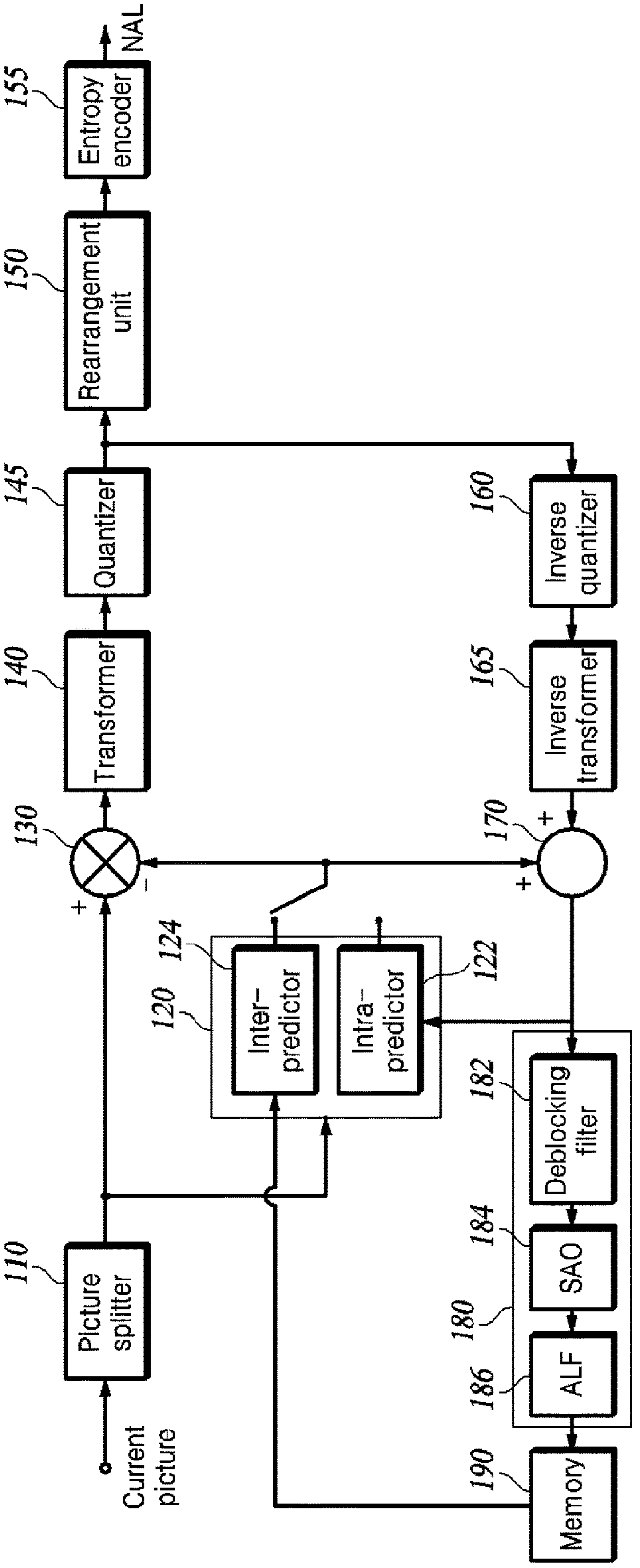
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
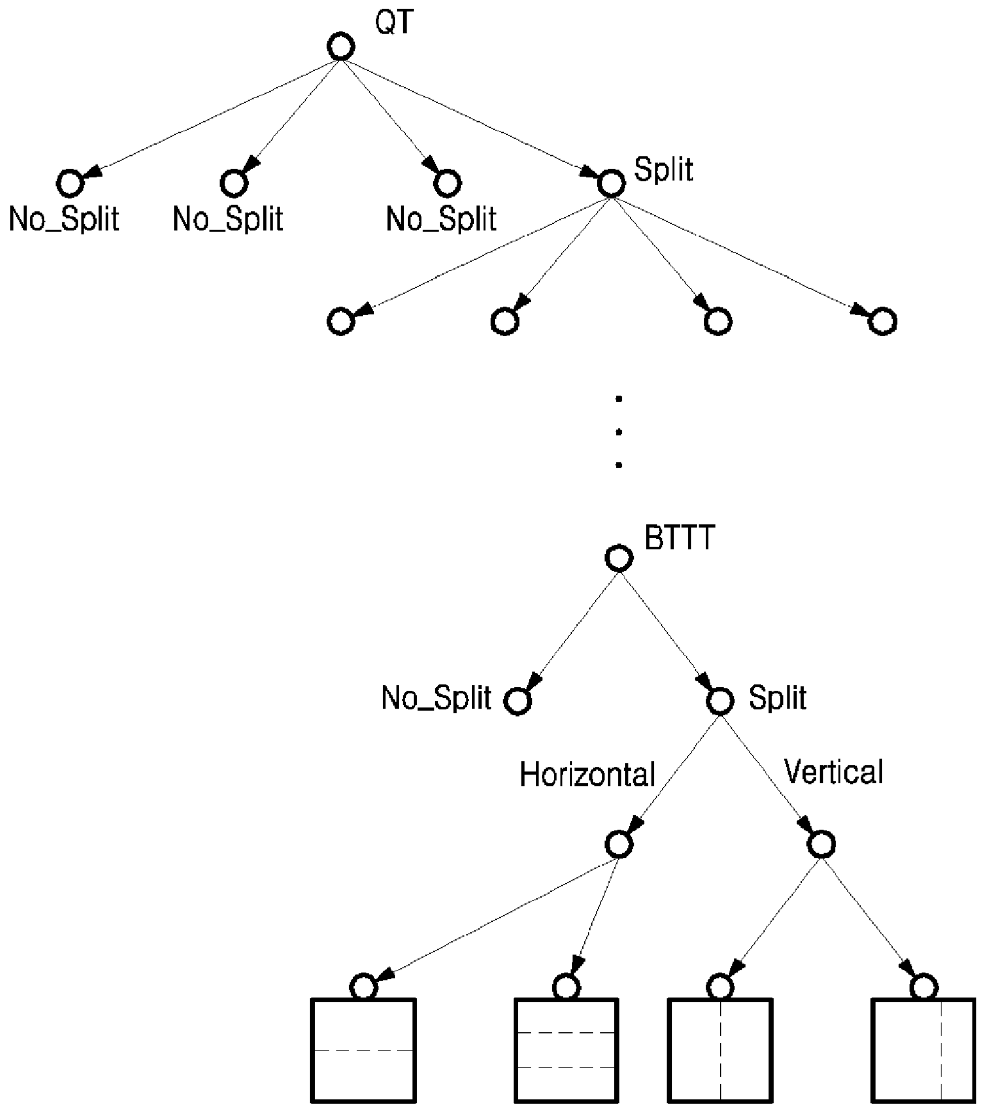
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
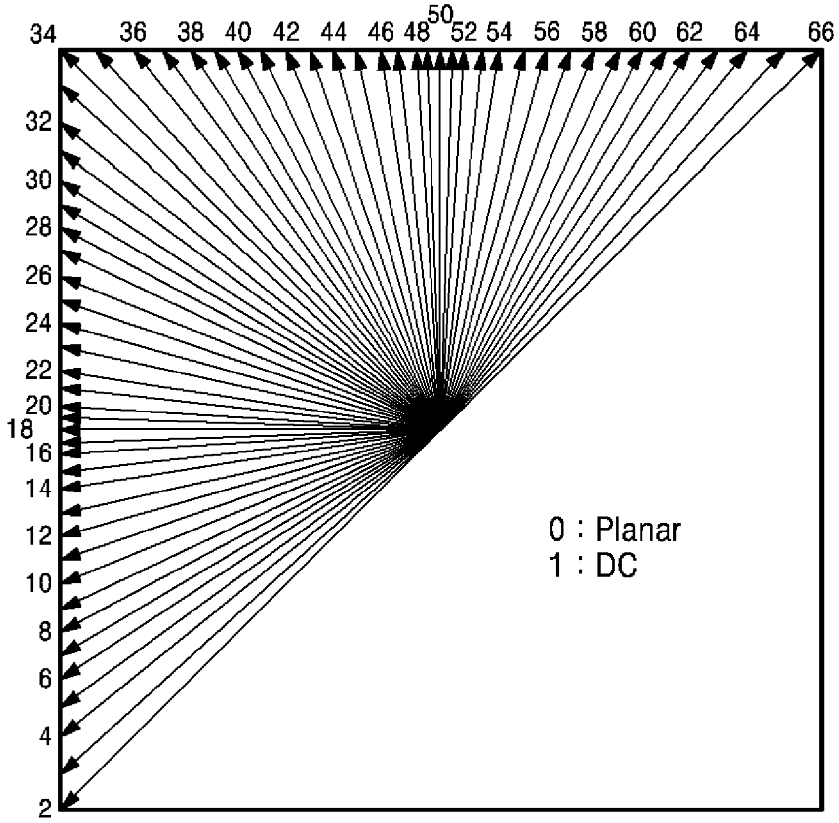
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
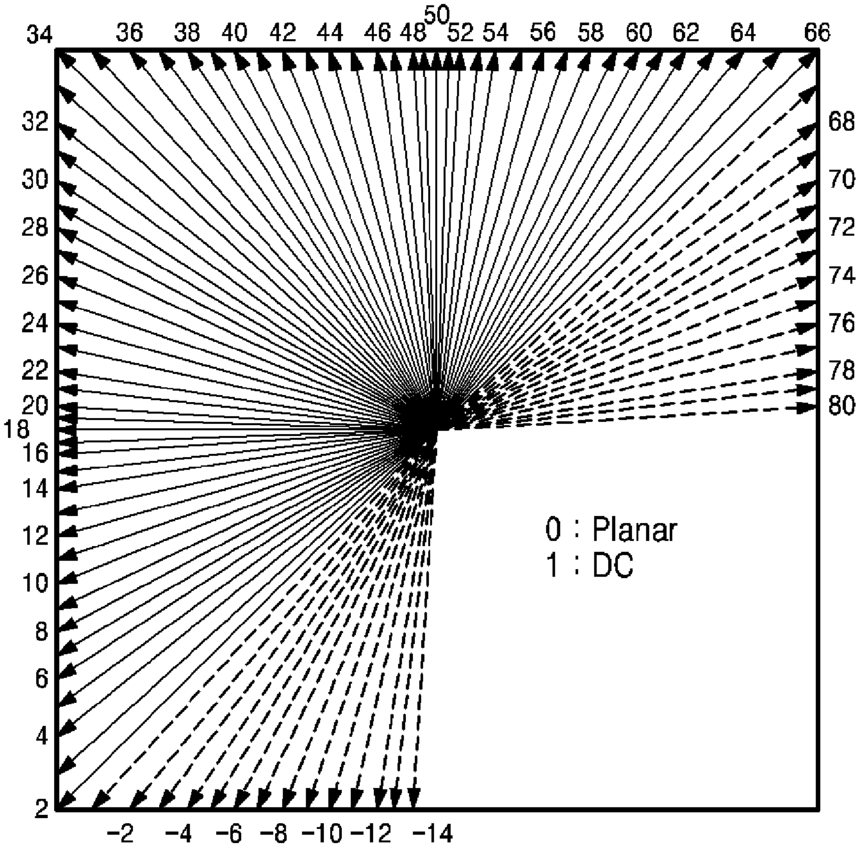

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel)

and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
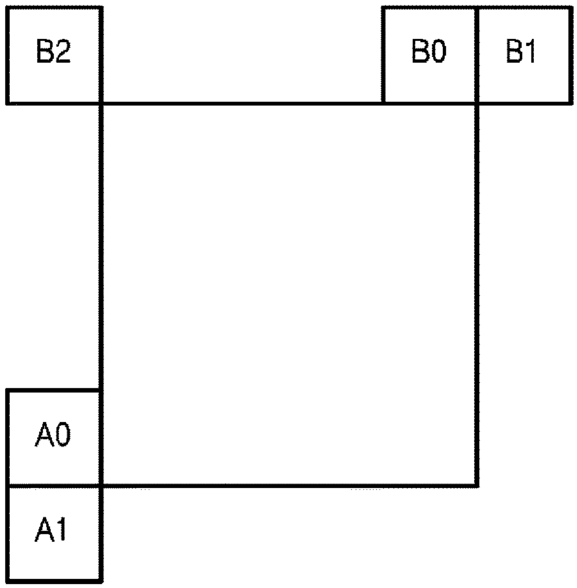
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
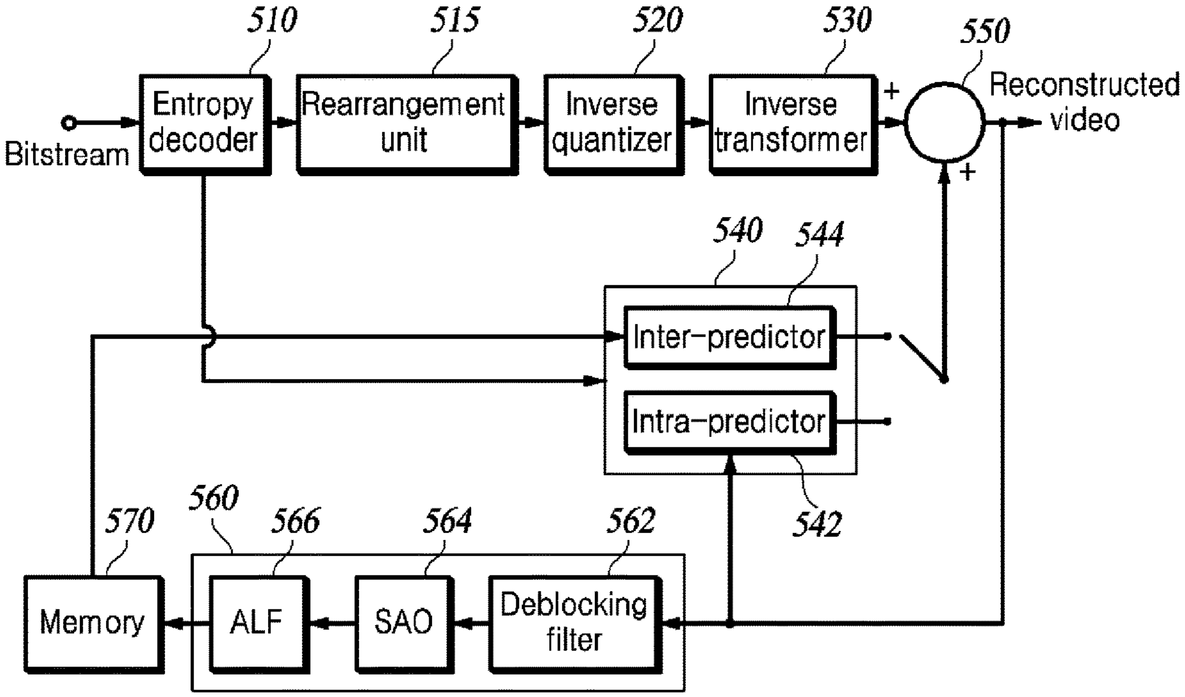
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of “0” as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that, in intra-predicting a current chroma block, encode/decode a component-specific prediction mode adapted to each of the video features of the Cb channel's and Cr channel's chroma components. Further, some embodiments provide a video coding method and an apparatus for encoding/decoding chroma component-specific prediction modes.

The following embodiments may be performed by the intra predictor 122 in the video encoding device. The following embodiments may also be performed by the intra predictor 542 in the video decoding device.

The video encoding device in the prediction of the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with the prediction of the current block.

In the following description, the term "target block" may be used interchangeably with the current block or coding unit (CU), or may refer to some area of a coding unit.

Further, the value of one flag being true indicates when the flag is set to 1. Additionally, the value of one flag being false indicates when the flag is set to 0.

I. Intra Prediction of Chroma Channels

In the VVC (Versatile Video Coding) technique, the intra-prediction mode of the luma block has 65 subdivided angular modes (i.e., 2 to 66), in addition to non-angular modes (i.e., planar and DC), as illustrated in FIG. 3A. The 65 angular modes, planar and DC are collectively referred to as 67 IPMs.

Depending on the prediction direction utilized by the luma block, the chroma block may also have limited access to the intra predictions of these subdivided angular modes. However, the intra prediction of the chroma block may not always utilize the various angular modes available to the luma block besides the horizontal and vertical directions. To be able to use these various angular modes, the prediction mode of the current chroma block needs to be set to a Derived Mode (DM). By setting the prediction mode to DM, the current chroma block may utilize other angular modes of the luma block than the horizontal and vertical modes.

When a chroma block encoded, the intra-prediction modes that are most often used or default to maintain image quality include planar, DC, vertical, horizontal, and DM. In DM, the intra-prediction mode of the luma block that is spatially corresponding to the current chroma block is utilized as the intra-prediction mode of the chroma block.

The video encoding device may signal to the video decoding device whether the intra-prediction mode of the chroma block is DM. In doing so, the video encoding device may communicate DM to the video decoding device in any number of ways. For example, the video encoding device may indicate whether the intra-prediction mode of the chroma block is DM by setting intra_chroma_pred_mode, which is information for indicating the intra-prediction mode of the chroma block, to a specific value and transmitting intra_chroma_pred_mode to the video decoding device.

If the chroma block is encoded in intra-prediction mode, the video encoding device may set the intra-prediction mode IntraPredModeC of the chroma block according to Table 1.

Hereinafter, to distinguish IntraPredModeC from intra_chroma_pred_mode which is information on the intra-prediction mode of the chroma block, they are denoted as chroma intra-prediction mode and chroma intra-prediction mode indicator, respectively.

TABLE 1

| cclm_mode_flag | cclm_mode_idx | intra_chroma_pred_mode | lumaIntraPredMode 0 | 50 | 18 | 1 | X (0 <= X <= 66) |
|---|---|---|---|---|---|---|---|
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

Here, lumaIntraPredMode is the intra-prediction mode of the luma block corresponding to the current chroma block (hereinafter, the 'luma intra-prediction mode'). IntraPredModeC is the chroma intra-prediction mode of the current chroma block. IntraPredModeC is defined at the spatial coordinates [xCb][yCb] of the current chroma block. Since the prior art uses the same intra-prediction mode for the Cb and Cr components constituting the chroma block, the spatial coordinates of the chroma block just indicate the coordinates of the Cb block on behalf of the Cb and Cr blocks.

lumaIntraPredMode indicates one of the prediction modes illustrated in FIG. 3A. For example, in Table 1, lumaIntraPredMode=0 indicates the planar prediction mode and lumaIntraPredMode=1 indicates the DC prediction mode. The cases that lumaIntraPredMode=18, 50, and 66 indicate angular modes, referred to as horizontal, vertical, and VDIA, respectively.

Meanwhile, the process of parsing the intra-prediction mode of the chroma block, performed by the video decoding device, is shown in Table 2.

TABLE 2

```
if( CclmEnabled )
   cclm_mode_flag
if( cclm_mode_flag )
   cclm_mode_idx
else
   intra_chroma_pred_mode
```

The video decoding device parses cclm_mode_flag which indicates whether to use Cross-Component Linear Model mode (CCLM mode). If cclm_mode_flag is 1 to enable CCLM mode, the video decoding device parses cclm_mode_idx, which indicates the CCLM mode. At this time, depending on the value of cclm_mode_idx, the CCLM mode may be one of the three modes which are CCLM_LT, CCLM_L, and CCLM_T. In addition, cclm_mode_idx may be parsed according to Table 3.

TABLE 3

| Value of cclm_mode_idx | Bin string |
|---|---|
| 0 (CCLM_LT) | 10 |
| 1 (CCLM_L) | 110 |
| 2 (CCLM_T) | 111 |

In the bin string in Table 3, a leading 1 indicates cclm_mode_flag=1.

On the other hand, if the cclm_mode_flag is 0, indicating non-use of CCLM mode, the video decoding device parses the intra_chroma_pred_mode indicating the intra-prediction mode according to Table 4.

TABLE 4

| Value of intra_chroma_pred_mode | Bin string |
|---|---|
| 0 | 0100 |
| 1 | 0101 |
| 2 | 0110 |
| 3 | 0111 |
| 4 | 00 |

In the bin string in Table 4, a leading 0 indicates CCLM_MODE_FLAG=0.

The video decoding device determines IntraPredModeC according to Table 1 by referencing intra_chroma_pred_mode and lumaIntraPredMode. Cases that intra_chroma_pred_mode=0, 1, 2, and 3 indicate planar, vertical, horizontal, and DC prediction modes, respectively. The case that intra_chroma_pred_mode=4 is DM (derived mode), where the value of IntraPredModeC, the chroma intra-prediction mode, is set equal to the value of lumaIntraPredMode.

In the prior art, the same intra-prediction mode is used for the two channels constituting the chroma block, i.e., the Cb channel and the Cr channel. However, since there may exist cases where the images of the Cb channel and the Cr channel are different, the prior art method may not always be optimal. This means that the optimal intra-prediction mode of each of the Cb channel and the Cr channel may be the same or different depending on the image. To solve this prior art issue, there is a need for a method of setting the optimal intra-prediction mode adaptively to the video features for each of the Cb channel and the Cr channel and efficiently transmitting the set information. According to the present disclosure, to increase the coding efficiency, the intra-prediction mode may be adaptively and efficiently encoded and decoded differently for each of the Cb and Cr channels to reflect the different features of the Cb and Cr videos. Preferred implementations of the present disclosure are described below.

Hereinafter, the Cb channel and the Cr channel are referred to as the first chroma channel and the second chroma channel, respectively. Alternatively, the Cb channel and the Cr channel may be referred to as the second chroma channel and the first chroma channel, respectively.

While implementations are described below centered on the video decoding device, they may be similarly applied to the video encoding device.

II. Implementations According to the Present Disclosure

<Implementation 1> Encoding the Prediction Mode Per Chroma Channel by Signaling Flag In this implementation, the video decoding device may use a separate prediction mode per chroma channel by parsing the chroma_shared_intra_mode_flag as shown in Table 5.

TABLE 5

```
chroma_shared_intra_mode_flag
if (chroma_shared intra_mode_flag ) {
  if( cclmEnabled )
    cclm_mode_flag
  if( cclm_mode_flag )
    cclm_mode idx
  else
    intra_chroma_pred_mode
}
else {
  if( cclmEnabled ) {
    cb_cclm_mode_flag
    cr_cclm_mode_flag
  }
  if( cb_cclm_mode_flag )
    cb_cclm_mode_idx
  else
    cb_intra_chroma_pred_mode
  if( cr_cclm_mode_flag )
    cr_cclm_mode_idx
  else
    cr_intra_chroma_pred_mode
}
```

Here, chroma-shared-intra-mode-flag indicates whether the same intra-prediction mode is to be shared by Cb and Cr channels. Hereafter, chroma_shared_intra_mode_flag is referred to as the chroma prediction mode sharing flag. In Table 5, if chroma_shared_intra_mode_flag is false, the video decoding device parses the syntax elements of the Cb channel and the Cr channel in parallel.

The video decoding device may also parse the chroma_shared_intra_mode_flag as shown in Table 6 to enable a separate prediction mode for each chroma channel. In Table 6, if chroma_shared_intra_mode_flag is false, the video decoding device parses the syntax elements of the Cb channel and then parses the syntax elements of the Cr channel.

TABLE 6

```
chroma_shared_intra_mode_flag
if (chroma_shared_intra_mode_flag ) {
  if( cclmEnabled )
    cclm_mode_flag
  if( cclm_mode_flag )
    cclm_mode_idx
  else
    intra_chroma_pred_mode
}
else {
  if( cclmEnabled )
    cb_cclm_mode_flag
  if( cb_cclm_mode_flag )
    cb_cclm_mode_idx
  else
    cb_intra_chroma_pred_mode
  if( cclmEnabled )
    cr_cclm_mode_flag
  if( cr_cclm_mode_flag )
    cr_cclm_mode_idx
  else
    cr_intra_chroma_pred_mode
}
```

If chroma_shared_intra_mode_flag is 1, the two chroma channels share the same value of prediction mode. Therefore, the video decoding device decodes the intra-prediction mode for only one chroma channel and then shares the decoded intra-prediction mode with the other chroma channel. On the other hand, if the chroma_shared_intra_mode_flag is 0, the two chroma channels do not share an intra-prediction mode, which indicates that the intra-prediction modes of the two chroma channels are different. Therefore, the video decoding device decodes the prediction modes of the two channels separately.

On the other hand, when the chroma_shared_intra_mode_flag is 0, to decode the prediction modes of the two chroma channels separately, the video decoding device may decode at least one of the syntax elements of the chroma channel's cclm_mode_flag, cclm_mode_idx, and intra_chroma_pred_mode on a per-channel basis. For each chroma channel, cclm_mode_flag may be set separately as cb_cclm_mode_flag and cr_cclm_mode_flag, and cclm_mode_idx may be set separately as cb_cclm_mode_idx and cr_cclm_mode_idx. Further, the intra_chroma_pred_mode may be set separately as cb_intra_chroma_pred_mode and cr_intra_chroma_pred_mode.

As described above, when the chroma_shared_intra_mode_flag is 1, the two chroma channels share the same value of prediction mode. Therefore, only the intra-prediction mode information corresponding to one of the Cb and Cr channels is encoded, and the encoded information may be shared as the intra-prediction mode information for the other channel. Described now is a case where the intra-prediction mode is shared by the two chroma channels, and cclm_mode_flag, cclm_mode_idx, and intra_chroma_pred_mode are encoded as the prediction mode information corresponding to the Cb channel. In this case, the video decoding device may be implemented to operate as follows.

```
cb__cclm__mode__flag = cclm__mode__flag
cr__cclm__mode__flag = cclm__mode__flag
cb__cclm__mode__idx = cclm__mode__idx
cr__cclm__mode__idx = cclm__mode__idx
cb__intra__chroma__pred__mode = intra__chroma__pred__mode
cr__intra__chroma__pred__mode = intra__chroma__pred__mode
```

On the other hand, if only the intra-prediction mode information corresponding to the Cr channel is encoded, the video decoding device may perform the above operations with the Cb and Cr channels switched.

Hereinafter, cclm_mode_flag is referred to as a CCLM mode flag, and cclm_mode_idx is referred to as a CCLM mode index. As described above, intra_chroma_pred_mode is referred to as the chroma intra-prediction mode indicator. For the Cb channel, cb_cclm_mode_flag is named cb CCLM mode flag or first CCLM mode flag, cb_cclm_mode_idx is named cb CCLM mode index or first CCLM mode index, and cb_intra_chroma_pred_mode is named cb intra-prediction mode indicator or first chroma intra-prediction mode indicator. Additionally, for the Cr channel, cr_cclm_mode_flag is referred to as the cr CCLM mode flag or the second CCLM mode flag, cr_cclm_mode_idx is referred to as the cr CCLM mode index or the second CCLM mode index, and cr_intra_chroma_pred_mode is referred to as the cr intra-prediction mode indicator or the second chroma intra-prediction mode indicator. As described above, the terms “first” and “second” may be used interchangeably.

When chroma_shared_intra_mode_flag is 0, more specific implementations of the methods of decoding the prediction modes of the two chroma channels are as follows.

<Implementation 1-1> Referencing the Prediction Mode of One Chroma Channel to Encode the Prediction Mode of the Other Chroma Channel In this implementation, the video decoding device refers to the prediction mode of one chroma channel (e.g., the Cb channel) to decode the prediction mode of the other chroma channel (e.g., the Cr channel). Hereinafter, for convenience, one chroma channel is defined as the Cb channel and the other chroma channel is defined as the Cr channel, which does not limit the present disclosure. Depending on the implementation, one chroma channel may be defined as the Cr channel and the other chroma channel may be defined as the Cb channel.

The prediction mode of the other channel, the Cr channel, may be one of at least three CCLM modes that are CCLM-LT, CCLM-L, and CCLM-T, DM, and four default modes that are planar, DC, horizontal, and vertical. In addition, the selected prediction mode may be expressed by selectively using cr_cclm_mode_flag, cr_cclm_mode_idx, cr_intra_chroma_pred_mode, and the like. For example, if the prediction mode of the Cr channel is one of the three CCLM modes, cr_cclm_mode_flag may have a value of 1, and cr_cclm_mode_idx may have one of the values 0, 1, and 2. Further, if the prediction mode of the Cr channel is not one of the CCLM modes, the cr_cclm_mode_flag has a value of 0, and the value of cr_intra_chroma_pred_mode has a value of the intra-prediction mode corresponding to the Cr channel.

To further increase coding efficiency, the values of the set cr_cclm_mode_flag, cr_cclm_mode_idx, and cr_intra_chroma_pred_mode may be encoded by reference to the values of the cb_cclm_mode_flag, cb_cclm_mode_idx, and cb_intra_chroma_pred_mode. For example, in the case that chroma_shared_intra_mode_flag=0, indicating that the Cb and Cr channels have different prediction modes, Implementation 1-1 may adaptively determine the method of encoding the Cr channel's prediction mode based on the Cb channel's prediction mode.

The following describes methods of adaptively decoding the syntax elements associated with the intra-prediction mode information of the Cr channel when (Implementation 1-1-1) the prediction mode of the Cr channel is CCLM mode and when (Implementation 1-1-2) it is not CCLM mode, i.e., DM and one of the four default modes.

<Implementation 1-1-1> when the Prediction Mode of the Cr Channel is CCLM Mode In this implementation, an effective encoding (or decoding) method of cr_cclm_mode_idx is described.

As described above, according to the prior art, when a chroma channel is encoded in CCLM mode, the video encoding device transmits a cclm_mode_flag indicating that it is encoded in one of three CCLM modes, and further transmits a cclm_mode_idx indicating one of the three CCLM modes. The CCLM prediction modes corresponding to cclm_mode_idx=0, 1, and 2 are, in order, CCLM_LT, CCLM_L, and CCLM_T modes. As shown in Table 3, the respective CCLM modes are binarized to a value of 0, 10, or 11, so the video encoding device finally entropy encodes the value of the bin string corresponding to cclm_mode_idx and transmits the encoded bin string. In addition, the video decoding device parses the cclm_mode_flag from the bitstream to determine whether the chroma channel is encoded in CCLM mode. If the chroma channel is encoded in CCLM mode, the video decoding device further parses the cclm_mode_idx to determine whether the CCLM mode is CCLM_LT, CCLM_L, or CCLM_T mode.

However, in this implementation, if chroma_shared_intra_mode_flag=0, the video decoding device may adaptively decode the intra-prediction mode information corresponding to the prediction mode of the Cr channel based on the prediction mode of the first decoded Cb channel as shown in Table 7. In other words, the video decoding device may adaptively derive the cr_cclm_mode_idx based on the cb_cclm_mode_flag and the cb_cclm_mode_idx.

TABLE 7

| Cb channel | | Cr channel | |
|---|---|---|---|
| cb_cclm_mode_flag | cb_cclm_mode_idx | cr_cclm_mode_idx | Bin string |
| 0 | — | 0 | 0 |
| | | 1 | 10 |
| | | 2 | 11 |
| 1 | 0 | 1 | 0 |
| | | 2 | 1 |
| | 1 | 0 | 0 |
| | | 2 | 1 |
| | 2 | 0 | 0 |
| | | 1 | 1 |

Herein, the bin string for the value of cb_cclm_mode_idx may be set just as in the prior art, as shown in Table 3.

The following example, cb_cclm_mode_flag=1, describes a case where the prediction mode of the Cb channel is CCLM mode. To adaptively set the decoding method of cr_cclm_mode_idx, this case uses the fact that the intra-prediction mode information of the Cb channel and the Cr channel is not shared based on the parsing performed on the value of chroma_shared_intra_mode_flag=0. After self-evidently inferring that the intra-prediction mode information of the Cr channel is not the same as that of the Cb channel, the video decoding device may adaptively set the decoding method of cr_cclm_mode_idx corresponding to the prediction mode of the Cr channel according to the already decoded prediction mode of the Cb channel. Since chroma_shared_intra_mode_flag=0, it is self-evident that the value of cr_cclm_mode_idx cannot be the same as the value of cb_cclm_mode_idx. Therefore, when decoding the cr_cclm_mode_idx value, the video decoding device may reduce the number of candidates to take into account by eliminating the CCLM mode corresponding to the cb_cclm_mode_idx value, and then may utilize the reduced candidates to decode the cr_cclm_mode_idx value.

One method for implementing the foregoing is described in Table 7. The following example describes a case where chroma_shared_intra_mode_flag=0 and the prediction mode of the Cb channel is CCLM_LT, that is, cb_cclm_mode_flag=1 and cb_cclm_mode_idx=0. At this point, based on the fact that chroma_shared_intra_mode_flag=0, it is self-evident that if the prediction mode of the Cb channel is CCLM_LT, then CCLM_LT mode is ruled out for the Cr channel. Therefore, during encoding (or, decoding), only CCLM_L mode or CCLM_T mode may be considered, with CCLM_LT mode excluded. For example, when decoding the CCLM mode of the Cr channel, if the prediction mode of the Cr channel is CCLM_L mode, the video decoding device may parse cr_cclm_mode_idx as 0, as shown in Table 7. Alternatively, if the prediction mode of the Cr channel is CCLM_T mode, cr_cclm_mode_idx may be parsed as 1.

Another example to be described is a case where chroma_shared_intra_mode_flag=0 and the prediction mode of the Cb channel is not CCLM mode, that is when cb_cclm_mode_flag=0. In this case, when encoding (or decoding) the CCLM mode of the Cr channel, cr_cclm_mode_idx may use the bin string of 0 for CCLM_LT mode, cr_cclm_mode_idx may use the bin string of 10 for CCLM_L mode, and cr_cclm_mode_idx may use the bin string of 11 for CCLM_T mode. If chroma_shared_intra_mode_flag=0 and the prediction mode of the Cb channel is not CCLM mode, the bin string for cr_cclm_mode_idx may be set just as in the prior art, as shown in Table 3.

<Implementation 1-1-2> when the Prediction Mode of the Cr Channel is not CCLM Mode In this implementation, an effective encoding (or decoding) method of cr_intra_chroma_pred_mode is described.

As described above, according to the prior art, when the prediction mode of the chroma channel is not CCLM mode, that is, when cclm_mode_flag=0, the intra-prediction mode of the chroma channel is determined to be one value according to the intra_chroma_pred_mode value in Table 4 and according to Table 1, and is then one value is used commonly for the Cb and Cr channels. In this implementation, upon determining the values of cb_intra_chroma_pred_mode and cr_intra_chroma_pred_mode, the video decoding device may determine the intra-prediction mode of the Cb channel according to cb_intra_chroma_pred_mode, in place of the intra_chroma_pred_mode value of Table 1. Similarly, in place of the intra_chroma_pred_mode value in Table 1, the intra-prediction mode of the Cr channel may be determined according to cr_intra_chroma_pred_mode.

According to the present disclosure, it is self-evident that based on chroma_shared_intra_mode_flag=0, the cr_intra_chroma_pred_mode value cannot be the same as the cb_intra_chroma_pred_mode value. Therefore, when decoding the cr_intra_chroma_pred_mode value, the video decoding device may reduce the number of candidates to take into account by eliminating the prediction mode corresponding to the cb_intra_chroma_pred_mode value, and then may use the reduced candidates to decode the cr_intra_chroma_pred_ mode.

As one method for implementing the foregoing, the bin strings for the value of cr_intra_chroma_pred_mode may be set differently depending on the prediction mode of the Cb channel, i.e., the values of cb_cclm_mode_flag and cb_intra_chroma_pred_mode, as shown in Table 8.

TABLE 8

| Cb channel | | Cr channel | |
|---|---|---|---|
| cb_cclm_mode_flag | cb_intra_chroma_pred_mode | cr_intra_chroma_pred_mode | Bin string |
| 0 | 0 | 1 | 10 |
| | | 2 | 110 |
| | | 3 | 111 |
| | | 4 | 0 |
| | 1 | 0 | 10 |
| | | 2 | 110 |
| | | 3 | 111 |
| | | 4 | 0 |
| | 2 | 0 | 10 |
| | | 1 | 110 |
| | | 3 | 111 |
| | | 4 | 0 |
| | 3 | 0 | 10 |
| | | 1 | 110 |
| | | 2 | 111 |
| | | 4 | 0 |
| | 4 | 0 | 00 |
| | | 1 | 01 |
| | | 2 | 10 |
| | | 3 | 11 |
| 1 | — | 0 | 100 |
| | | 1 | 101 |
| | | 2 | 110 |
| | | 3 | 111 |
| | | 4 | 0 |

Here, the bin string for the cb_intra_chroma_pred_mode value may be set just as in the prior art, as shown in Table 4.

The following example describes the case where chroma_shared_intra_mode_flag=0, cb_cclm_mode_flag=0, and cb_intra_chroma_pred_mode=4, that is when the prediction mode of the Cb channel is DM. If cr_intra_chroma_pred_mode has a value of 0, that is when the prediction mode of the Cr channel is planar, the video decoding device may parse cr_intra_chroma_pred_mode as 00 according to Table 8.

<Implementation 1-2> Separately Encoding the Prediction Mode of the Two Chroma Channels In this implementation, the video decoding device separately decodes the prediction mode of the Cr channel without reference to the prediction mode of the Cb channel. For example, consistent with the prior art in Table 3 and Table 4, the video decoding device may decode the Cb channel and the Cr channel separately. The following example describes a case where the prediction mode of the Cb channel is CCLM_LT mode and the prediction mode of the Cr channel is CCLM_T mode. In this case, the values of chroma_shared_intra_mode_flag=0, cb_cclm_mode_flag=1, cb_cclm_mode_idx=0, cr_cclm_mode_flag=1, and cr_cclm_mode_idx=2, and cb_cclm_mode_idx may be decoded as 0 and cr_cclm_mode_idx may be decoded as 11.

<Implementation 2> Adaptively Encoding Prediction Mode Per Chroma Channel

In this implementation, the video decoding device decodes the prediction modes of the chroma channels separately, without parsing the flag indicating whether the Cb and Cr channels share the same intra-prediction mode, which is chroma_shared_intra_mode_flag. To illustrate the operation of this implementation, the following describes a method of encoding the intra-prediction mode information for the Cr channel, assuming that conventional techniques are used to encode the intra-prediction mode of the Cb channel. Additionally, in this implementation, the encoding (or, decoding) method of the Cb channel and the Cr channel may be implemented with the roles of the two channels reversed.

Figure 6:
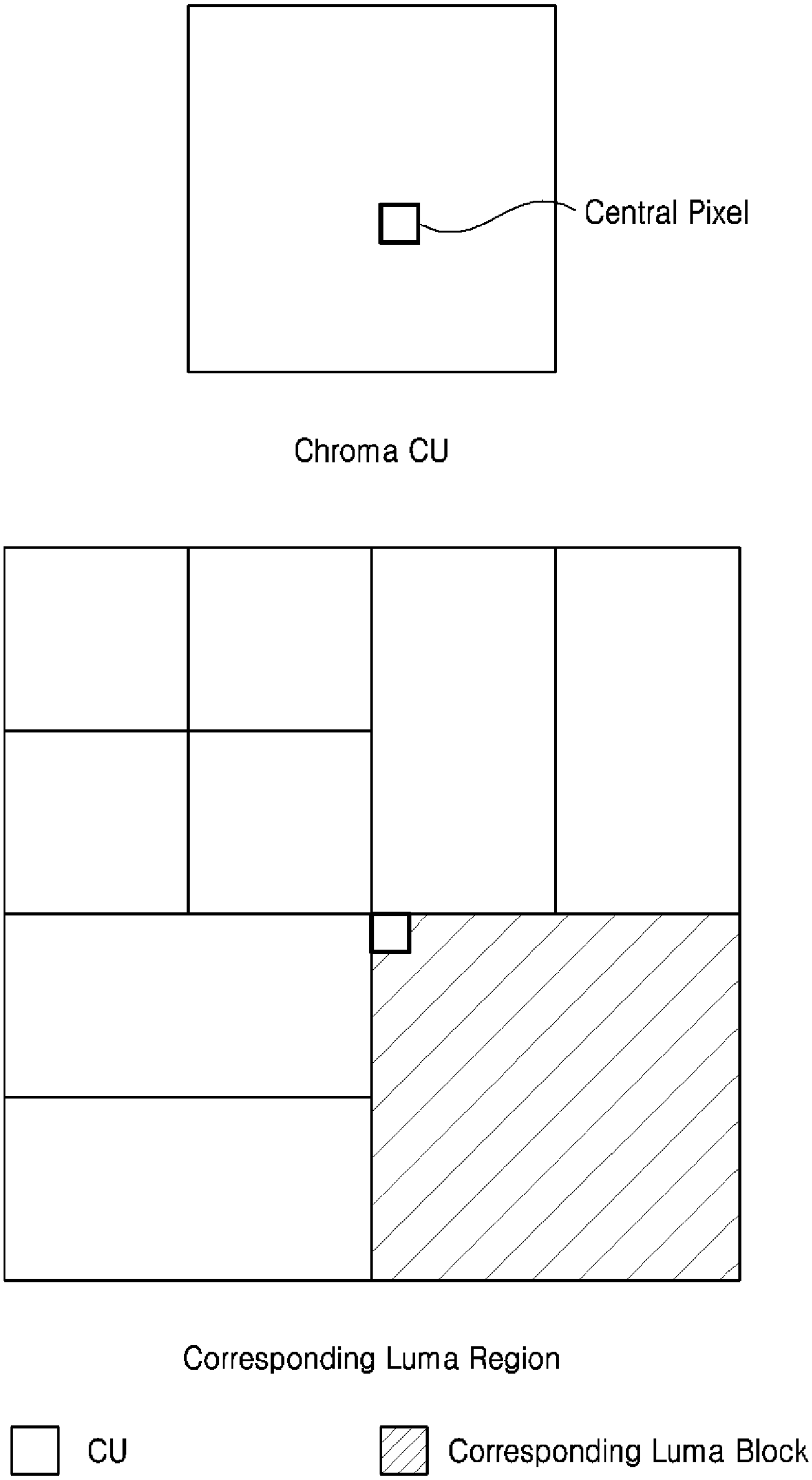
FIG. 6 is a diagram illustrating where a derived mode (DM) is applied to in a corresponding luma block.

One of the chroma channel prediction modes, DM (derived mode), has a very good coding efficiency. As described above, the chroma block determined in DM inherits the prediction mode of the luma block corresponding to the current chroma block as the prediction mode of the Cb and Cr chroma blocks. In this case, the corresponding luma block represents a luma block that includes the luma channel's pixel corresponding to the pixel at the center position of the current chroma block, as shown in the example of FIG. 6.

DM is a very efficient intra-prediction mode encoding technique for chroma channels when the features of the Cb channel and Cr channel are very similar to each other, as it uses the prediction mode of the luma channel as it is as the prediction mode of the current chroma channel. However, if the features of the Cb channel and Cr channel are different and do not use the same intra-prediction mode information, the DM technique cannot be used. This is because using the DM technique in such cases may degrade the video quality.

In this implementation, the video decoding device can decode different intra-prediction mode information for the Cb channel and the Cr channel, but can also adaptively inherit (or share) intra-prediction information between the chroma channels. If the image properties between the chroma channels are different such that it is inefficient to use DM techniques, only the Cb channel can share the intra-prediction mode information of the luma channel. Alternatively, the Cr channel can inherit the intra-prediction mode information of the Cb channel even if the Cb channel does not share the intra-prediction mode information with the luma channel. As described above, the intra-prediction mode for each of the Cb and Cr channels can be efficiently decoded for more diverse cases. Hereinafter, the above-described technique is referred to as the Chroma Derived Mode (CDM) technique.

Figure 7:
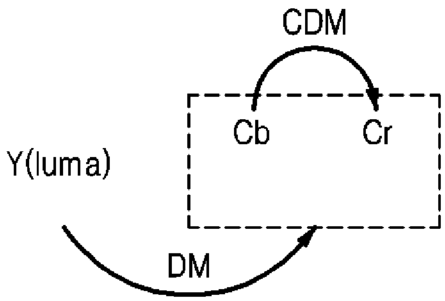
FIG. 7 is a diagram illustrating the use of DM and chroma derived mode (CDM) techniques, according to at least one embodiment of the present disclosure.

In one example, when the CDM technology is used, the Cr channel may selectively inherit the intra-prediction mode of the Cb channel, as shown in the example of FIG. 7. Namely, when the video features of the Cb channel and the Cr channel are very similar, the video decoding device utilizes DM. Accordingly, by setting the intra-prediction mode of the Cb and/or Cr channels according to the inheritance, coding efficiency can be increased. If the video features of the Cb channel and the Cr channel are very different, the Cb and Cr channels may not inherit the same intra-prediction mode. When the CDM technology is used according to the present disclosure, the video decoding device may selectively inherit the intra-prediction mode of the Cb channel for the Cr channel, as shown in the example of FIG. 7. Further, when compared to the luma channel, if the Cb channel is similar, but the video feature of the Cr channel is very different, the Cb channel may inherit the intra-prediction mode information of the luma channel, but the Cr channel may not inherit the intra-prediction mode information of the luma channel. Alternatively, the Cb channel may not inherit the intra-prediction mode information of the luma channel, but the Cr channel may inherit the intra-prediction mode information of the Cb channel.

Meanwhile, whether one is in CDM (chroma derived mode) may be signaled by using cr_intra_inherit_mode_flag. For example, if cr_intra_inherit_mode_flag=1, the video decoding device uses CDM. On the other hand, if cr_intra_inherit_mode_flag=0, CDM is not used. Where CDM is used, when decoding the prediction mode of a Cr channel block, the video decoding device inherits the prediction mode of the Cb channel block corresponding to the current Cr channel block and uses the prediction mode of the Cb channel as the prediction mode of the Cr channel. The corresponding Cb channel block, similar to the corresponding luma block according to the example of FIG. 6, represents the Cb channel's block that includes the Cb channel's pixels corresponding to the pixels at the center position of the current Cr channel block. For example, if the prediction mode of the Cr channel is CDM and the prediction mode of the corresponding Cb channel block is CCLM_LT, the latter may be used to generate the predictor of the Cr channel block efficiently.

Hereinafter, cr_intra_inherit_mode_flag is referred to as the chroma prediction mode inheritance flag.

In this implementation, either Implementation 2-1 or Implementation 2-2 may be implemented, depending on the interrelationship between DM and CDM, as shown in Table 9 and Table 10.

TABLE 9

| DM mode | CDM mode | Inherit action |
|---|---|---|
| True | N/A | Y → Cb → Cr |
| False | True | Cb → Cr |
| | False | N/A |

TABLE 10

| DM mode | CDM mode | Inherit action |
|---|---|---|
| True | True | Y → Cb → Cr |
| | False | Y → Cb |

TABLE 10-continued

| DM mode | CDM mode | Inherit action |
|---|---|---|
| False | True | Cb → Cr |
| | False | N/A |

In Implementation 2-1 corresponding to Table 9, when DM is determined, the implementation uses CDM without separately signaling whether CDM is in or not. In this case, no information is signaled to indicate whether CDM is in. In other words, if DM is signaled to be in, CDM is inferred as being used. Additionally, if not in DM, signaling of CDM information may signal whether CDM is used. On the other hand, Implementation 2-2 corresponding to Table 10, signals separate information indicating whether CDM is used even if DM is determined to be in.

<Implementation 2-1> Encoding the Prediction Mode of the Cr Channel by Referring to the Prediction Mode of the Cb Channel This implementation corresponds to Table 9. In this implementation, the video decoding device will infer the value of cr_intra_inherit_mode flag to be 1 if the intra-prediction mode of the Cb channel is DM, without separately parsing the value of cr_intra_inherit_mode_flag indicating whether CDM is to use or not. The video decoding device may adaptively decode the prediction mode of the Cr channel as shown in Table 11 by considering the prediction mode of the luma channel and the prediction mode of the Cb channel.

TABLE 11

```
if( cclmEnabled )
  cb_cclm_mode_flag
if( cb_cclm_mode_flag )
  cb_cclm_mode_idx
else
  cb_intra_chroma_pred_mode
if ( cb_intra_chroma_pred_mode != 4 )
  cr_intra_inherit_mode_flag
if (!cr_intra_inherit_mode_flag ) {
  if( cclmEnabled )
    cr cclm_mode_flag
  if( cr_cclm_mode_flag )
    cr_cclm_mode_idx
  else
    cr_intra_chroma_pred_mode
}
```

The detailed operation of decoding the intra-prediction mode of the chroma channels according to Table 11 is as follows. After parsing the intra-prediction mode of the Cb channel, the video decoding device decodes the intra-prediction mode of the Cr channel. As mentioned above, cr_intra_inherit_mode_flag is a flag that indicates whether the prediction mode of the Cr channel inherits the prediction mode of the Cb channel. If cr_intra_inherit_mode_flag=1, the video decoding device inherits the prediction mode of the Cb channel without a separate decoding process for the Cr channel.

In this implementation, the DM utilizes the luma channel's prediction mode commonly in both the Cb and Cr channels, as shown in Table 9, which is eventually equivalent to the Cr channel's inheriting of the Cb channel's intra-prediction mode. Therefore, if the intra-prediction mode of the Cb channel is DM, the video decoding device may infer the value of cr_intra_inherit_mode_flag to be 1 without parsing the value of cr_intra_inherit_mode_flag separately. This can further increase the coding efficiency of the system. Therefore, as shown in Table 11, the video decoding device checks whether "(cb_intra_chroma_pred_mode !=4)" is correct. If the value of (cb_intra_chroma_pred_mode !=4) is true, i.e., DM is not in, the video decoding device parses the cr_intra_inherit_mode_flag. A case signaled by cr_intra_inherit_mode_flag=0 is neither DM nor CDM, so the intra-prediction mode of the Cr channel may not inherit the intra-prediction mode of the Cb channel.

Meanwhile, if cr_intra_inherit_mode_flag is 1, the video decoding device inherits the prediction mode of the Cb channel to set the prediction mode of the Cr channel without having to parse any additional information. On the other hand, if cr_intra_inherit_mode_flag is 0, the video decoding device parses additional information to set the prediction mode of the Cr channel. For example, the video decoding device parses the cr_cclm_mode_flag to determine whether the prediction mode of the Cr channel is CCLM mode (cross-component linear model mode) and then parses the cr_cclm_mode_idx or cr_intra_chroma_pred_mode value depending on the cr_cclm_mode_flag value. In short, if cr_cclm_mode_flag is 1, cr_cclm_mode_idx is parsed, and if cr_cclm_mode_flag is 0, cr_intra_chroma_pred_mode may be parsed. At this time, from the fact that the value of cr_intra_inherit_mode_flag is 0, it is self-evident that the intra-prediction mode information of the Cr channel, which is cr_cclm_mode_flag, cr_cclm_mode_idx, cr_intra_chroma_pred_mode, and the like, is not the same as the intra-mode information of the Cb channel. Therefore, when decoding the intra-prediction mode information of the Cr channel, the video decoding device may remove the intra-prediction mode information corresponding to the Cb channel to reduce the number of candidates to take into account, and then may utilize the reduced candidates to decode the intra-prediction mode information of the Cr channel.

The following describes a method of adaptively decoding the syntax elements associated with the intra-prediction mode information of the Cr channel based on the prediction mode of the Cb channel, when (Implementation 2-1-1) the Cr channel's prediction mode is CCLM mode and when (Implementation 2-1-2) the Cr channel's prediction mode is not CCLM mode, i.e., when the Cr channel's prediction mode is DM and one of the four default modes.

<Implementation 2-1-1> when the Prediction Mode of the Cr Channel is Cross-Component Linear Model Mode (CCLM Mode)

In this implementation, an effective encoding (or decoding) method of cr_cclm_mode_idx is described.

When the prediction mode of the Cb channel is one of the CCLM modes, i.e., when cb_cclm_mode_flag=1, the CDM information may be used to determine whether the prediction mode of the Cr channel is that one CCLM mode. Therefore, the video decoding device can parse just two cr_cclm_mode_idx values instead of three cr_cclm_mode_idx values, depending on the prediction mode of the Cb channel, i.e., according to cb_cclm_mode_idx. The decoding method for cr_cclm_mode_idx according to this implementation is shown in Table 12.

TABLE 12

| Cb channel | | Cr channel | |
|---|---|---|---|
| cb_cclm_mode_flag | cb_cclm_mode_idx | cr_cclm_mode_idx | Bin string |
| 0 | — | 0 | 0 |
| | | 1 | 10 |
| | | 2 | 11 |
| 1 | 0 | 1 | 0 |
| | | 2 | 1 |
| | 1 | 0 | 0 |
| | | 2 | 1 |
| | 2 | 0 | 0 |
| | | 1 | 1 |

For example, if the Cb channel's prediction mode is CCLM_L (cb_cclm_mode_flag=1, cb_cclm_mode_idx=1) and the Cr channel's prediction mode is CCLM_T (cr_cclm_mode_idx=2), the video decoding device parses cr_cclm_mode_idx as 1.

<Implementation 2-1-2> when the Prediction Mode of the Cr Channel is not CCLM Mode In this implementation, an effective encoding (or decoding) method of cr_intra_chroma_pred_mode is described.

If cr_intra_chroma_pred_mode is 4 (i.e., DM), it may be inferred that cr_intra_inherit_mode_flag=1, and thus cr_intra_chroma_pred_mode can be decoded. Therefore, in this implementation, the video decoding device performs decoding of cr_intra_chroma_pred_mode for cases where the value of cr_intra_chroma_pred_mode is 0, 1, 2, or 3.

If cb_intra_chroma_pred_mode is one of 0, 1, 2, and 3 since the CDM is used to indicate one of cr_intra_chroma_pred_mode=0, 1, 2, and 3, the video decoding device decodes just three prediction modes. The decoding method of cr_cclm_mode_idx according to this implementation is shown in Table 13.

As another example, if cb_cclm_mode_flag=0 and cb_intra_chroma_pred_mode=3, such that the Cb channel's prediction mode is DC, and if cr_intra_chroma_pred_mode=0, such that the Cr channel's prediction mode is planar, the video decoding device may parse cr_intra_chroma_pred_mode as 0.

<Implementation 2-2> an Alternative Method of Encoding the Prediction Mode of the Cr Channel by Referring to the Prediction Mode of the Cb Channel This implementation corresponds to Table 10. In this implementation, the video decoding device parses the cr_intra_inherit_mode_flag indicating whether the Cb channel's intra-prediction mode is CDM, regardless of whether the Cb channel's intra-prediction mode is DM. The video decoding device may adaptively decode the Cr channel's prediction mode by considering the prediction mode of the luma channel and the Cb channel's prediction mode, as shown in Table 14.

TABLE 13

| Cb channel | | Cr channel | |
|---|---|---|---|
| cb_cclm_mode_flag | cb_intra_chroma_pred_mode | cr_intra_chroma_pred_mode | Bin string |
| 0 | 0 | 1 | 0 |
| | | 2 | 10 |
| | | 3 | 11 |
| | 1 | 0 | 0 |
| | | 2 | 10 |
| | | 3 | 11 |
| | 2 | 0 | 0 |
| | | 1 | 10 |
| | | 3 | 11 |
| | 3 | 0 | 0 |
| | | 1 | 10 |
| | | 2 | 11 |
| | 4 | 0 | 00 |
| | | 1 | 01 |
| | | 2 | 10 |
| | | 3 | 11 |
| 1 | — | 0 | 00 |
| | | 1 | 01 |
| | | 2 | 10 |
| | | 3 | 11 |

For example, if the Cb channel's prediction mode is CCLM_LT, i.e., cb_cclm_mode_flag=1 and cb_cclm_mode_idx=0, and cr_intra_chroma_pred_mode=0, such that the Cr channel's prediction mode is planar mode, the video decoding device parses cr_intra_chroma_pred_mode as 00.

TABLE 14

```
if( cclmEnabled )
  cb_cclm_mode_flag
if( cb_cclm_mode_flag )
```

TABLE 14-continued

```
    cb_cclm_mode_idx
else
    cb_intra_chroma_pred_mode
cr_intra_inherit_mode_flag
if (!cr_intra_inherit_mode_flag ) {
    if( cclmEnabled )
        cr_cclm_mode_flag
    if( cr_cclm_mode_flag )
        cr_cclm_mode_idx
    else
        cr_intra_chroma_pred_mode
}
```

The detailed operation of decoding the intra-prediction mode of the chroma channel according to Table 14 is as follows. After parsing the Cb channel's intra-prediction mode, the video decoding device decodes the Cr channel's intra-prediction mode. To parse the Cr channel's intra-prediction mode, the video decoding device first parses the cr_intra_inherit_mode_flag. If the Cr channel's prediction mode is CDM, the cr_intra_inherit_mode_flag is parsed as 1. Otherwise, it is parsed as 0.

As an example, if the cr_intra_inherit_mode_flag is 1, the video decoding device does not separately parse the Cr channel's intra-prediction mode information but directly inherits the corresponding information of the Cb channel. In other words, the following process may be performed.

```
cr__cclm__mode__flag = cb__cclm__mode__flag
cr__cclm__mode__idx = cb__cclm__mode__idx
cr__intra__chroma__pred__mode = cb__intra__chroma__pred__mode
```

Further, if cr_intra_inherit_mode_flag is 0, the video decoding device may parse cr_cclm_mode_flag indicating whether the Cr channel's prediction mode is CCLM mode, and then may parse cr_cclm_mode_idx or cr_intra_chroma_pred_mode depending on the value of cr_cclm_mode_flag after parsing the latter. For example, if cr_cclm_mode_flag is 1, cr_cclm_mode_idx may be parsed; on the other hand, if cr_cclm_mode_flag is 0, cr_intra_chroma_pred_mode may be parsed. The video decoding device may adaptively parse cr_cclm_mode_idx and cr_intra_chroma_pred_mode according to the prediction mode of the Cb channel. As the adaptive parsing method, the methods of Implementation 2-1-1 and Implementation 2-2-2 described above may be used.

<Implementation 2-3> Yet Another Method of Encoding the Prediction Mode of the Cr Channel by Referring to the Prediction Mode of the Cb Channel In Implementations 2-1 and 2-2 above, cr_intra_inherit_mode flag is a flag indicating whether the Cr channel's prediction mode inherits the Cb channel's prediction mode. However, in this implementation, cr_intra_inherit_mode_flag indicates whether the Cr channel's prediction mode inherits the prediction mode from another channel. Therefore, in this implementation, the video decoding device parses the cr_intra_inherit_mode flag regardless of whether the Cb channel's intra-prediction mode is DM (derived mode) or not. Namely, when the prediction mode is inherited from either the luma channel or the Cb channel, the cr_intra_inherit_mode_flag is set to 1. On the other hand, if cr_intra_inherit_mode_flag=0, the Cr channel's prediction mode is not inherited from either channel.

As described above, since the Cr channel's prediction mode may be inherited from two channels, the video decoding device parses cr_intra_inherit_mode_idx to set the channel that inherits the prediction mode. For example, if cr_intra_inherit_mode_idx=0, the Cr channel inherits the prediction mode from the luma channel. This is the same as when the prediction mode is DM in the prior art. Additionally, if cr_intra_inherit_mode_idx=1, the Cr channel inherits the prediction mode from the Cb channel. This is the same as when the prediction mode is CDM as described above.

Hereinafter, cr_intra_inherit_mode_idx is referred to as the chroma prediction mode inheritance index.

However, if the Cb channel's prediction mode is DM, i.e., if the Cb channel's prediction mode is inherited from the luma channel, the Cr channel's inheritance of the prediction mode from the Cb channel is equivalent to inheriting the prediction mode of the luma channel. Therefore, when decoding cr_intra_inherit_mode_idx, the video decoding device may remove the intra-prediction mode information corresponding to the Cb channel to reduce the number of candidates to take into account, and then may use the reduced candidates to decode the intra-prediction mode information of the Cr channel. When decoding cr_intra_inherit_mode_idx, if there is only one candidate left, the video decoding device will infer cr_intra_inherit_mode_idx to be 0 or 1 without parsing it. For example, based on a conventional channel configuration, if the Cb channel's prediction mode is DM, i.e., if the Cb channel inherits the prediction mode from the luma channel, cr_intra_inherit_mode_idx may be inferred to be 0 or 1 without parsing. The video decoding device may adaptively decode the Cr channel's prediction mode by considering the luma channel's prediction mode and the Cb channel's prediction mode, as shown in Table 15.

TABLE 15

```
if( cclmEnabled )
    cb_cclm_mode_flag
if( cb_cclm_mode_flag )
    cb_cclm_mode _idx
else
    cb_intra_chroma_pred_mode
cr_intra_inherit_mode_flag
if (cr_intra_inherit_mode_flag ) {
    if ( cb_intra_chroma_pred_mode != 4 )
        cr_intra_inherit_mode_idx
} else {
    if( cclmEnabled )
        cr_cclm_mode_flag
    if( cr_cclm_mode_flag )
        cr_cclm_mode_idx
    else
        cr_intra_chroma_pred_mode
}
```

The detailed operation of decoding the intra-prediction mode of the chroma channel according to Table 15 is as follows. After parsing the Cb channel's intra-prediction mode, the video decoding device decodes the Cr channel's intra-prediction mode. To parse the Cr channel's intra-prediction mode, the video decoding device first parses the cr_intra_inherit_mode_flag. If the Cr channel's prediction mode inherits the prediction mode from either of the luma channel and the Cb channel, the cr_intra_inherit_mode_flag is parsed as 1. Otherwise, it is parsed as 0.

In addition, if cr_intra_inherit_mode_flag is 1, the video decoding device may further parse cr_intra_inherit_mode_idx. If cr_intra_inherit_mode_idx is 0, the video decoding device inherits the Cr channel's intra-prediction mode from the luma channel. On the other hand, if cr_intra_inherit_mode_idx is 1, the video decoding device may inherit the Cr channel's intra-prediction mode from the Cb channel. However, if the Cb channel's prediction mode is DM, i.e., if cb_intra_chroma_pred_mode=4, the Cr channel inherits the same prediction mode even if it inherits the prediction mode from either channel. Therefore, even if the cr_intra_inherit_mode_flag is 1, the video decoding device does not parse cr_intra_inherit_mode_idx and inherits the Cr channel's prediction mode from the Cb channel. As another example, the Cr channel may inherit the prediction mode from the luma channel.

As another example, if cr_intra_inherit_mode_flag is 1, the video decoding device may inherit the intra-prediction mode information of the Cr channel directly from either the luma channel or the Cb channel, depending on cr_intra_inherit_mode_idx, without parsing the intra-prediction mode information of the Cr channel separately. Namely, if cr_intra_inherit_mode_idx=0, the Cr channel's prediction mode is set to the luma channel's prediction mode, and if cr_intra_inherit_mode_idx=1, the Cr channel's prediction mode may be set to the Cb channel's prediction mode.

On the other hand, if cr_intra_inherit_mode_flag is 0, the video decoding device may parse cr_cclm_mode_flag indicating whether the Cr channel's prediction mode is CCLM mode, and then may parse cr_cclm_mode_idx or cr_intra_chroma_pred_mode depending on the value of cr_cclm_mode_flag. Namely, if cr_cclm_mode_flag is 1, cr_cclm_mode_idx may be parsed; on the other hand, if cr_cclm_mode_flag is 0, cr_intra_chroma_pred_mode may be parsed. The video decoding device may adaptively parse cr_cclm_mode_idx and cr_intra_chroma_pred_mode according to the Cb channel's prediction mode. As the adaptive parsing method, the methods of Implementation 2-1-1 and Implementation 2-2-2 described above may be used.

<Implementation 2-4> Separately Encoding the Prediction Modes of the Two Chroma Channels In this implementation, the video decoding device decodes the Cr channel's prediction mode separately and independently of the Cb channel's prediction mode. As in the prior art, for each chroma channel, the prediction mode is encoded (or decoded) according to Table 2. Regardless of whether the prediction modes of the two channels, Cb and Cr, are the same, the video decoding device may parse the Cb channel's prediction mode according to Table 16 and then may parse the Cr channel's prediction mode.

TABLE 16

```
if( cclmEnabled )
    cb_cclm_mode_flag
if( cb_cclm_mode_flag )
    cb_cclm_mode_idx
else
    cb_intra_chroma_pred_mode
if( cclmEnabled )
    cr_cclm_mode_flag
if( cr_cclm_mode_flag )
    cr_cclm_mode_idx
else
    cr_intra_chroma_pred_mode
```

In this case, cb_cclm_mode_idx, cb_intra_chroma_pred_mode, cr_cclm_mode_idx, and cr_intra_chroma_pred_mode may be encoded just as in the prior art, as shown in Table 3 or Table 4. For example, if the Cb channel's prediction mode is CCLM_LT and the Cr channel's prediction mode is also CCLM_LT, the values of cb_cclm_mode_idx=0 and cr_cclm_mode_idx=0, which are decoded as 0 and 0, respectively. As another example, if the Cb channel's prediction mode is planar mode and the Cr channel's prediction mode is DC mode, the values cb_intra_chroma_pred_mode=0 and cr_intra_chroma_pred_mode=3, which may be decoded as 100 and 111, respectively.

<Implementation 3> Encoding the Combined Information of the Prediction Modes of the Respective Chroma Channels In this implementation, when N is the number of all prediction modes that may be signaled on a chroma channel, the video decoding device decodes one of all combinations (i.e., $N^2$ combinations) that may be generated by setting N prediction modes on each of the Cb and Cr channels. According to the prior art, N=8, so the number of possible prediction mode combinations is 64. The encoding of the intra-prediction modes of the chroma channels may (Implementation 3-1) take into account all of these mode combinations or (Implementation 3-1) some of mode combinations to signal the prediction modes of the two chroma channels.

<Implementation 3-1> Considering all of the Prediction Mode Combinations

In this implementation, the video decoding device decodes the prediction modes of the two chroma channels by considering all of the above-described prediction mode combinations.

First, the prediction mode combinations may be encoded as bin strings of fixed length. The video decoding device parses all prediction mode combinations into bin strings of the same length. In this case, the length of the bin string may be set to ceil($\log_2 N^2$). Here, ceil(•) denotes a rounding-up function. For example, according to the conventionally available prediction modes of the chroma channel (i.e., N=8), the combinations of prediction modes of the chroma channel according to this implementation may be represented by the bin strings as shown in Table 17.

TABLE 17

| Intra prediction mode of Cb channel | Intra prediction mode of Cr channel | Bin string |
|---|---|---|
| CCLM_LT | CCLM_LT | 000000 |
| CCLM_LT | CCLM_L | 000001 |
| . . . | . . . | . . . |
| CCLM_LT | DC | 000111 |
| CCLM_L | CCLM_LT | 001000 |
| CCLM_L | CCLM_L | 001010 |
| . . . | . . . | . . . |
| DC | DC | 111111 |

Second, certain combinations of prediction modes may be encoded as short bin strings. It may not be efficient to encode all prediction mode combinations into bin strings of the same length. Therefore, the prediction mode combinations may be partitioned into a group of combinations that are encoded in relatively short bin strings and another group of combinations that are encoded in relatively long bin strings. The group encoded with short bin strings is referred to as the chroma Most Probable Mode Set (MPMS), and the group encoded with long bin strings is referred to as the chroma MPMS reminder. In this implementation, to decode the prediction modes of the chroma channel, the video decoding device parses the chroma_mpms_flag which indicates whether the prediction mode is included in the chroma MPMS, as shown in Table 18.

TABLE 18

| |
|---|
| **chroma_mpms_flag** |
| if( chroma_mpms_flag ) |
| **chroma_mpms_idx** |
| else |
| **chroma_mpms_remainder_idx** |

The chroma MPMS may be formed in the following ways. In addition, chroma_mpms_idx and chroma_mpms_remainder_idx, which indicate combinations of prediction modes in the chroma MPMS and the chroma MPMS reminder, may be encoded according to a fixed length method, a truncated binary method, a truncated Rice method, or the like.

In one example, a combined formation that is preset as chroma MPMS may be used. For example, K combinations (K=1, 2, 3, . . . ) of prediction modes may be included in the chroma MPMS. When K=4, the chroma MPMS may be formed as follows: Chroma MPMS={(Planar, Planar), (Planar, CCLM_LT), (CCLM_LT, Planar), (CCLM_LT, CCLM_LT)}. Here, each element of the chroma MPMS represents a pair of (prediction mode of the Cb channel, prediction mode of the Cr channel). When the chroma MPMS is formed as described above, 60 of the 64 prediction mode combinations are included in the chroma MPMS reminder, excluding the 4 prediction mode combinations included in the chroma MPMS.

As another example, the video decoding device may form the chroma MPMS by using a combination of neighboring prediction modes for each channel in the current chroma block. The neighboring prediction modes represent one or a plurality of prediction modes of blocks adjacent to the top and left of the current block. Depending on the embodiment of the present disclosure, the number of neighboring prediction modes and the position where to derive the prediction modes may vary.

Figure 8:
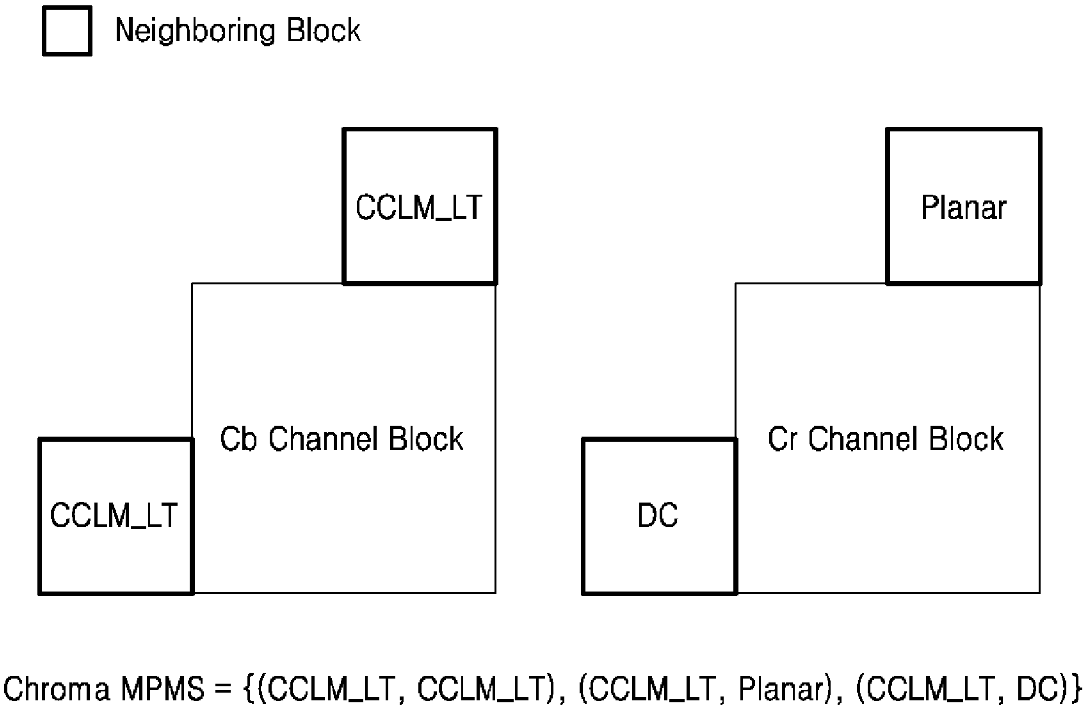
FIG. 8 is a diagram illustrating the structure of a chroma most probable mode set (MPMS), according to at least one embodiment of the present disclosure.

The following example describes a case of setting one prediction mode from the top of the current block and another prediction mode from the left as neighboring prediction modes. If the coordinate of the top-left pixel of the current block is (0, 0), the top prediction mode may be set to the prediction mode of the block containing the pixel at position (W−1, −1) and the left prediction mode may be set to the prediction mode of the block containing the pixel at position (−1, H−1). Here, W represents the width of the current block, and H represents the height of the current block. Under the aforementioned conditions, the chroma MPMS according to the neighboring prediction modes of the chroma block may be formed as shown in the example of FIG. 8.

<Implementation 3-2> Taking Account of Some of the Prediction Mode Combinations

In this implementation, the video decoding device parses the prediction mode combinations included in the chroma MPMS, according to the second method of Implementation 3-1 (encoding certain prediction mode combinations as short bin strings). Therefore, the video decoding device parses chroma_mpms_idx without parsing chroma_mpms_flag. In other words, the prediction mode combinations contained in the chroma MPMS reminder are not used.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor
155: entropy encoder
510: entropy decoder
544: intra predictor

The invention claimed is:

1. A method performed by a video decoding device for decoding an intra-prediction mode of a current chroma block, the method comprising:

decoding, from a bitstream, first intra-prediction mode information for a first chroma channel of the current chroma block; and decoding, from the bitstream, second intra-prediction mode information for a second chroma channel of the current chroma block, wherein the first intra-prediction mode information comprises at least one of a first cross-component prediction mode flag (CCP mode flag), a first cross-component prediction mode index (CCP mode index), or a first chroma intra-prediction mode indicator, and the second intra-prediction mode information comprises at least one of a second CCP mode flag, a second CCP mode index, or a second chroma intra-prediction mode indicator, and wherein decoding the second intra-prediction mode information for the second chroma channel comprises, when the first CCP mode flag and the second CCP mode flag are different, decoding either of the second CCP mode index indicating one of CCP mode candidates or the second chroma intra-prediction mode indicator indicating one of intra-prediction mode candidates.

2. The method of claim 1, further comprising:

decoding, from the bitstream, a chroma prediction mode sharing flag that indicates whether the first chroma channel and the second chroma channel share a common intra-prediction mode; and checking the chroma prediction mode sharing flag, wherein when the chroma prediction mode sharing flag is false, the method further comprises:

decoding the first intra-prediction mode information and decoding the second intra-prediction mode information.

3. The method of claim 2, further comprising, when the chroma prediction mode sharing flag is true:

decoding the first intra-prediction mode information for the first chroma channel; and setting the second intra-prediction mode information for the second chroma channel to be equal to the first intra-prediction mode information.

4. The method of claim 2, wherein decoding the second intra-prediction mode information comprises, when the chroma prediction mode sharing flag is false:

decoding the second intra-prediction mode information by reference to the first intra-prediction mode information.

5. The method of claim 4, wherein decoding the second intra-prediction mode information comprises, when the chroma prediction mode sharing flag is false, the first CCP mode flag is true, and the second CCP mode flag is true:

generating, from the CCP mode candidates, a reduced number of candidates by removing a CCP mode corresponding to a value of the first CCP mode index, and then decoding a second CCP mode index indicating one of the reduced number of candidates.

6. The method of claim 4, wherein decoding the second intra-prediction mode information comprises, when the chroma prediction mode sharing flag is false, the first CCP mode flag is false, and the second CCP mode flag is true:

decoding the second CCP mode index indicating one of the CCP mode candidates.

7. The method of claim 4, wherein decoding the second intra-prediction mode information comprises, when the chroma prediction mode sharing flag is false, the first CCP mode flag is true, and the second CCP mode flag is false:

decoding the second chroma intra-prediction mode indicator indicating one of the intra-prediction mode candidates.

8. The method of claim 4, wherein decoding the second intra-prediction mode information comprises, when the chroma prediction mode sharing flag is false, the first CCP mode flag is false, and the second CCP mode flag is false:

generating, from the intra-prediction mode candidates, a reduced number of candidates by removing a prediction mode corresponding to a value of the first chroma intra-prediction mode indicator, and then decoding a second chroma intra-prediction mode indicator that indicates one of the reduced number of candidates.

9. The method of claim 1, further comprising:

decoding, from the bitstream, a chroma prediction mode inheritance flag that indicates whether the second chroma channel inherits the first intra-prediction mode information of the first chroma channel; and checking the chroma prediction mode inheritance flag, wherein when the chroma prediction mode inheritance flag is true, the second chroma channel inherits the first intra-prediction mode information.

10. The method of claim 9, wherein, when the chroma prediction mode inheritance flag is false, further comprising:

decoding of the second intra-prediction mode information.

11. The method of claim 9, wherein, when the first intra-prediction mode information does not inherit intra-prediction mode information of a luma channel, further comprising:

decoding the chroma prediction mode inheritance flag.

12. A method performed by a video encoding device for encoding an intra-prediction mode of a current chroma block, the method comprising:

determining first intra-prediction mode information for a first chroma channel of the current chroma block; and determining second intra-prediction mode information for a second chroma channel of the current chroma block, wherein the first intra-prediction mode information comprises at least one of a first cross-component prediction mode flag (CCP mode flag), a first cross-component prediction mode index (CCP mode index), or a first chroma intra-prediction mode indicator, and the second intra-prediction mode information comprises at least one of a second CCP mode flag, a second CCP mode index, and or a second chroma intra-prediction mode indicator, and wherein the method further comprises, when the first CCP mode flag and the second CCP mode flag are different, encoding either of the second CCP mode index indicating one of CCP mode candidates or the second chroma intra-prediction mode indicator indicating one of intra-prediction mode candidates.

13. The method of claim 12, further comprising:

determining a chroma prediction mode sharing flag based on whether the first chroma channel and the second chroma channel share a common intra-prediction mode; and encoding the chroma prediction mode sharing flag.

14. The method of claim 13, further comprising, when the chroma prediction mode sharing flag is true:

encoding the first intra-prediction mode information.

15. The method of claim 13, further comprising, when the chroma prediction mode sharing flag is false:

encoding the first intra-prediction mode information; and encoding the second intra-prediction mode information.

16. The method of claim 13, further comprising, when the chroma prediction mode sharing flag is false:

encoding the first intra-prediction mode information; and encoding the second intra-prediction mode information by reference to the first intra-prediction mode information.

17. A method for transmitting encoded video data comprising a bitstream, the method comprising:

generating the bitstream for a current block in an image; and transmitting the bitstream;

wherein generating the bitstream for the image comprises:

determining first intra-prediction mode information for a first chroma channel of a current chroma block; and determining second intra-prediction mode information for a second chroma channel of the current chroma block, wherein the first intra-prediction mode information comprises at least one of a first cross-component prediction mode flag (CCP mode flag), a first cross-component prediction mode index (CCP mode index), or a first chroma intra-prediction mode indicator, and the second intra-prediction mode information comprises at least one of a second CCP mode flag, a second CCP mode index, or a second chroma intra-prediction mode indicator, and wherein the method further comprises, when the first CCP mode flag and the second CCP mode flag are different, encoding either of the second CCP mode index indicating one of CCP mode candidates or the second chroma intra-prediction mode indicator indicating one of intra-prediction mode candidates.

* * * * *